Figure 1:

Aug. 9, 1960     D. M. JOHNSON     2,948,069
DEVICE FOR STIMULATING THE MENTAL PROCESSES
Filed Oct. 11, 1957

INVENTOR.
Darrell M. Johnson
BY
A. Yates Dowell.
Attorney

United States Patent Office 2,948,069
Patented Aug. 9, 1960

2,948,069

DEVICE FOR STIMULATING THE MENTAL PROCESSES

Darrell M. Johnson, 121 E. Hill St., Thomson, Ga.

Filed Oct. 11, 1957, Ser. No. 689,714

3 Claims. (Cl. 35—8)

This invention relates to the promotion of individual expression including the functioning of the nervous system and the thought processes, in a manner to stimulate the same to greater activity and to the production of new thoughts and ideas as well as the expression and communication of the same to others.

The invention is concerned primarily with the stimulation of expression on the part of an individual when undertaking to develop, express, and record, ideas on a particular subject, and which ideas are suitable for use in printed form as an address or speech, as reading matter, or otherwise in connection with any subject and in order when alone to obtain the resultant benefits as well as the release of pent up feelings, accompanying tensions, and emotions and the satisfaction obtained from such expression.

The invention is concerned particularly with the changing of the environment of the human mind from one which is lifeless and inert to one which is active and alert and in which the nervous system cooperates to attain full and adequate expression and description of the ideas conceived and intended to be conveyed regardless of whether the individual is alone, before a microphone, telephone, television camera or in other stimuli-lacking situation, or where the psychological environment is of a character to create tension and dissipate thought and concentration and thereby dispel the ability to create ideas.

The invention contemplates further the automatic direction of one's expressive efforts in voice and actions toward a single object which may be inanimate but may be animated to portray a feeling of life, participation, and cooperation to thereby stimulate expression relative to the topic or subject under consideration with resultant improvement and intensity of such expression.

Difficulty has been experienced in concentrating upon a topic or subject without the stimulation resulting from the presence of someone or something to assist in providing and maintaining such concentration. Consequently, without motivation, new thoughts and ideas have decreased or materially lagged.

It is an object of the invention to overcome the problems enumerated, to activate, motivate and stimulate the nervous system in order to increase depth and length of thought, to enable the mind of a person to function more satisfactorily and efficiently in the creation of new ideas and solution of problems.

Another object of the invention is to provide a device for maintaining attention causing concentration and promoting expression responsive, at least in part, to an impression received from the device which reacts as if it has been impressed or stimulated.

Another object of the invention is to provide a device that simulates an animate object, including the eyes, and with means by which such eyes can be illuminated and portions of the device electronically responsive to the sound of the voice.

Figure 2:
Figure 3:
Figures 6, 7:
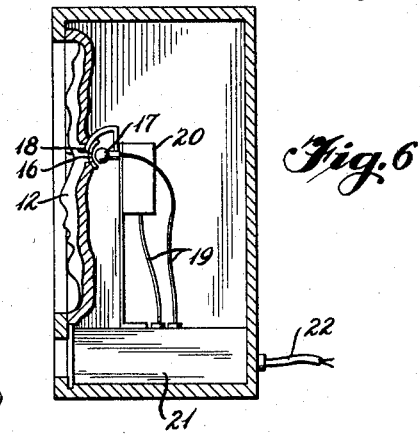
Figure 5:
Figure 4:

Other objects and advantages of the invention will be apparent from the following description taken in conjunction with the accompanying drawing wherein:

Fig. 1 is a front elevation of the head and shoulders of a figure representing a man;

Fig. 2, a perspective of a plaster bust of a man;

Fig. 3, a front elevation of a plaster relief of a person;

Fig. 4, a framed photograph of the head and shoulders of a man;

Fig. 5, a perspective of a man seated in a chair;

Fig. 6, a section on the line 6—6 of Fig. 3; and

Fig. 7, fragmentary detail of eye-operating mechanism.

Briefly stated, the invention comprises a device for activating or stimulating the functioning of the nervous system and associated muscles used in expression. Such device is composed of a likeness of an animate object such as a human being including the eyes, and means by which such likeness can be practically brought to life and its presence felt due not only to the appearance of the device but due also to the appearance of the eyes which disseminate light, effected by sound such as that of the human voice, thereby providing lifelike animation in the inanimate device and also due to the movement of eyelids upon energization of appropriate actuating means.

With continued reference to the drawing, the invention may be illustrated by the likeness of a person, the head and shoulders of a man 10 being illustrated in Fig. 1, a plaster bust 11 being represented in Fig. 2, a plaster relief 12 being represented in Fig. 3, a framed photograph or picture 13 of a man being represented in Fig. 4, and the figure of a man 14 in a chair 15 being illustrated in Fig. 5.

The invention is intended to be practiced with any one of the devices of Figs. 1 to 5, inclusive, with certain of the parts of each modified to show animation, for example the most appropriate portion to animate is the eye, because people look each other in the eye when carrying on a conversation, the illustration given being purely for the purpose of illustration and not by way of limitation.

In each of the human representations the eye is preferably provided with a round portion 16 to correspond to the human eye and with a light source 17 adapted to glow or flash with high or controlled frequency when receiving sound impression, also if desired, the eye may include a movable eyelid 18 and the device may have any other desired animating features.

The light 17 as well as the movement of the eyelids 18 may be electrically actuated, receiving electrical energy through conductors 19 and an amplifier 20 from a transmitter or microphone 21 having a connection 22 with a source of electrical energy power supply so that the impulse received by the microphone or transmitter 21 through the conductors 19 and amplifier 20 causes the light 17 to be illuminated or to flash. The usual impulsess produced in the microphone 21 are amplified by the amplifier 20 to produce sufficient current in the light 17 to accomplish this result.

The eyelids 18 may be caused to move by any desired means for example a solenoid 24 connected by a link 25 to a shaft 26 to a hub 27 carrying a bracket 28 on which the eyelid representing portion 18 is mounted.

In operation the animation of the eyes is accomplished by the voice which causes the light bulbs to be energized to disseminate light in the region of the eyes. Control mechanism including a solenoid or the like may cause the eyelids to move. The transmitter, microphone, or reception unit may be located on the figure near the throat, the lower portion of the face or in other desired location such as that to which a speaker usually directs his voice.

The lens portion of the eye 16 may be either transparent or if preferred it may be only translucent, but in either case sufficient light can pass to be detected by anyone in front thereof.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A device for stimulating the functioning of the nervous system and associated muscles employed in expression comprising an object shaped to simulate the face of a human being, said object including two simulated eye-like portions, each of said simulated eye-like portions comprising a member having an outwardly rounded surface adapted to transmit and disseminate light, illuminating means mounted behind the face-like object and rearwardly of the eye-like portions adapted to transmit light through the eye-like portions, movably mounted simulated eyelids positioned above said eye-like portions for movement downward to a position to cover the eye-like portions, sound responsive means mounted within said object, means connecting the sound responsive means with the illuminating means and the eyelids whereby the sound of a human voice directed to the sound responsive means actuates the movement of the eyelids and actuates the illuminating means to simulate a human reaction to the sound of a voice.

2. A device according to claim 1 wherein the simulated eyelids are pivotally mounted for movement in an arcuate manner downwardly and actuated through a solenoid mounted behind the face-like object.

3. A device according to claim 1 wherein the face-like object is constructed of plaster material and having a throat portion, the sound responsive means including a microphone positioned near said throat portion of the object.

References Cited in the file of this patent

UNITED STATES PATENTS

| 2,247,329 | Deitz | June 24, 1941 |
| 2,324,774 | Henry | July 20, 1943 |
| 2,633,667 | Brown et al. | Apr. 7, 1953 |
| 2,700,250 | Williams | Jan. 25, 1955 |

FOREIGN PATENTS

| 492,633 | Germany | Feb. 26, 1930 |